United States Patent [19]

Richards

[11] Patent Number: 5,438,635
[45] Date of Patent: Aug. 1, 1995

[54] METHOD AND APPARATUS FOR ENCODING AND STORING PIXEL VALUES AND FOR DECODING AND REPRODUCING A DIGITISED IMAGE

[75] Inventor: Norman D. Richards, Horsham, England

[73] Assignee: U.S. Philips Corporation, New York, N.Y.

[21] Appl. No.: 715,033

[22] Filed: Jun. 11, 1991

Related U.S. Application Data

[63] Continuation of Ser. No. 450,332, Dec. 13, 1989, abandoned.

Foreign Application Priority Data

Dec. 23, 1988 [GB] United Kingdom ................ 8830184

[51] Int. Cl.[6] .......................... G06K 9/36; H03M 7/30
[52] U.S. Cl. ...................................... 382/232; 341/76
[58] Field of Search ...................... 382/56; 358/12, 13, 358/135, 136, 342; 341/55, 76, 106; 348/384, 426

[56] References Cited

U.S. PATENT DOCUMENTS

| | | | |
|---|---|---|---|
| 4,573,167 | 2/1986 | Hentschke et al. | 341/76 |
| 4,578,704 | 3/1986 | Gharavi | 358/135 |
| 4,646,148 | 2/1987 | Lienard et al. | 358/135 |
| 4,710,823 | 12/1987 | Kitazawa | 358/448 |
| 4,734,768 | 3/1988 | Pexa | 358/135 |
| 4,744,230 | 5/1988 | Shum | 70/68 |
| 4,745,473 | 5/1988 | Hall | 358/13 |
| 4,857,992 | 8/1989 | Richards | 358/135 |
| 4,858,026 | 8/1989 | Richards | 358/135 |
| 4,862,261 | 8/1989 | Tanaka | 358/135 |
| 4,868,764 | 9/1989 | Richards | 382/56 |
| 4,922,340 | 5/1990 | Iwai | 358/135 |

*Primary Examiner*—Michael T. Razavi
*Assistant Examiner*—David Fox
*Attorney, Agent, or Firm*—Michael E. Marion

[57] ABSTRACT

A method of processing a first series of values representing a row of pixels of a digitized image for differentially encoding the first series of pixel values to generate a first series of codes representing a first series of differential values; expanding each code of the first series into a group of codes to form a second series of codes, each group of codes representing a plurality of differential values whose sum is the differential value represented by the corresponding code of the first series; and decoding the second series of codes to generate a second series of pixel values for display. By transmitting or recording the first series of codes and then effectively dividing each received or reproduced differential value into two or more smaller differential values, known apparatus can be made with little modification to expand each line of a received image by a factor of two or more, depending on the number of codes in each group. The extra pixel values generated will be at least approximately linearly interpolated values. This allows improved moving pictures to be reproduced from an optical disc, for example.

46 Claims, 6 Drawing Sheets

| a | x | b | x | c | x |
|---|---|---|---|---|---|
| x | x | x | x | x | x |
| d | x | e | x | f | x |
| x | x | x | x | x | x |

Fig.5.

| a | a | b | b | c | c |
|---|---|---|---|---|---|
| a | a | b | b | c | c |
| d | d | e | e | f | f |
| d | d | e | e | f | f |

Fig.6.

| a | $\frac{a+b}{2}$ | b | $\frac{b+c}{2}$ | c |
|---|---|---|---|---|
| $\frac{a+d}{2}$ | $\frac{a+b+d+e}{4}$ | $\frac{b+e}{2}$ | $\frac{b+c+e+f}{4}$ | $\frac{c+f}{2}$ |
| d | $\frac{d+e}{2}$ | e | $\frac{e+f}{2}$ | f |
| $\frac{d+g}{2}$ | $\frac{d+e+g+h}{4}$ | $\frac{e+h}{2}$ | $\frac{e+f+h+i}{4}$ | $\frac{f+i}{2}$ |
| g | $\frac{g+h}{2}$ | h | $\frac{h+i}{2}$ | i |

Fig.7.

| a | $\frac{a+b}{2}$ | b | $\frac{b+c}{2}$ | c |
|---|---|---|---|---|
| x | x | x | x | x |
| d | $\frac{d+e}{2}$ | e | $\frac{e+f}{2}$ | f |
| x | x | x | x | x |
| g | $\frac{g+h}{2}$ | h | $\frac{h+i}{2}$ | i |

Fig. 8.

| CODE | — | 2 | 2 | 3 | 3 | 15 | 15 | 14 | 14 |
|---|---|---|---|---|---|---|---|---|---|
| DIFF | — | 4 | 4 | 9 | 9 | -1 | -1 | -4 | -4 |

| VAL | 16 | 20 | 24 | 33 | 42 | 41 | 40 | 36 | 32 |
|---|---|---|---|---|---|---|---|---|---|

METHOD AND APPARATUS FOR ENCODING AND STORING PIXEL VALUES AND FOR DECODING AND REPRODUCING A DIGITISED IMAGE

This is a continuation of application Ser. No. 07/450,332, filed Dec. 13, 1989, abandoned.

BACKGROUND OF THE INVENTION

The invention relates to an apparatus for decoding a first series of codes representing a first series of differential values corresponding to a row of pixels of a digitised image.

The invention further relates to a method of encoding a first series of values representing a row of pixels of a digitised image.

The invention still further relates to an apparatus for reproducing a stored digitised image, to a method of storing a digitised image and to a storage device wherein an image has been stored in accordance with such a method.

Differential coding for image transmission or storage is well known generally in the art, but a particular example is in the Compact Disc-Interactive system described for example in "CD-I—a Designer's Overview" published by Kluwer (ISBN 9020121103). In the CD-I system, natural photographic images can be encoded and recorded on an optical disc for subsequent retrieval, decoding and display by the CD-I player. The encoding technique used achieves a high degree of data compression, but the data rate of the data channel (the disc reading apparatus) is not high enough to permit sequences of such images to be displayed as moving pictures unless the images are limited to a small area of the available display screen. Storage and retrieval can be generally considered as analogous to transmission and reception, both being characterised by frequency response and noise parameters. The present invention is thus relevant to both transmission and storage systems in which bandwidth is limited.

It is known that such images can be expanded in the known apparatus to fill a larger screen area, but only by repeating the received pixel values to display each value over a large block of pixels. This technique introduces a "mosaic" effect, however, which is visually obtrusive and generally undesirable.

It is further known that satisfactory expansion of digitised images can be achieved by using linear interpolation to generate intermediate pixel values. The interpolation can be performed substantially independently in the line scan (hereinafter "horizontal") and field scan (hereinafter "vertical") directions.

Unfortunately, the differential nature of the coding in the known systems makes known interpolation techniques unsuitable particularly in products such as the CD-I player which are aimed at the consumer market.

SUMMARY OF THE INVENTION

It is an object of the invention to enable the expansion of images by linear interpolation in the line scan (horizontal) within an apparatus of the kind described, and in particular to do so in a manner which is technically compatible with existing systems such as CD-I and is relatively inexpensive to implement.

The invention provides a decoding apparatus comprising means for receiving a first series of codes representing a first series of differential values corresponding to a row of pixels of a differentially encoded image, means for expanding each code of the first series into a group of codes to form a second series of codes, each group of codes representing a plurality of differential values whose sum is the differential value represented by the corresponding code of the first series, and a decoder for decoding the second series of codes to generate a second series of pixel values for display.

By effectively dividing each received differential value into two or more smaller differential values, known apparatus can be made with little or no modification to expand each line of a received image by a factor of two or more, depending on the number of codes in each group. If the plurality of differential values represented within each group are made equal then the extra pixel values generated will be exactly those that would have been produced by an ideal linear interpolator. Larger images can thus be transmitted in the same amount of time, at decreased resolution, without introducing obtrusive artefacts. This allows improved moving pictures to be reproduced from an optical disc, for example.

The expanding means may be arranged to receive part of an image encoded using a first set of quantisation levels while the decoder is arranged to decode the second series of codes using a second set of quantisation levels, each level of the first set of quantisation levels being the sum of a plurality of levels of the second set. The plurality of levels of the second set which sum to each level of the first set may be exactly equal to one another to provide exact linear interpolation.

Optimum quantisation levels for the first set can be chosen by a system designer in a known manner to make full use of the channel bandwidth and give a good frequency response to the transmission or storage system. However, the levels of this optimum set of quantisation levels may not be ones which can be expressed as of sums of equal levels of the second set, or even sums of unequal levels of the second set.

In such a case, each level of the first set of quantisation levels may be defined as that level which can be expressed as a sum of a plurality of levels of the second set, and which is closest to an optimum level, each level of the plurality of levels of the second set of quantisation levels being chosen to be non-zero at least when the level of the first set exceeds a given value. The plurality of levels chosen from the second set may not be equal, so that accurate interpolation is not achieved. However by making them at least non-zero, or as close to equal as the constraints of the second set allow, the 'mosaic' pattern becomes blurred, or broken up so as to be less obtrusive. In other words, a compromise can be made between the desire for strict linear interpolation on the one hand and the constraints of the limited range of quantisation levels available and the desired channel characteristics on the other hand.

The second set of quantisation levels may be that set defined for the decoder in a player according to the Compact Disc-Interactive standard. The CD-I standard defines a set of 16 levels ranging fron +128 through zero to −79. The decoding step can thus be performed using a standard CD-I decoder chip. The first set of quantisation levels may consist of values which are multiples of the levels of that second set, or may be compromise values chosen as described above using that second set (or any other desirable set) as the optimum set.

Each pixel value may comprise a plurality of components while the first and second series of codes comprise first and second series of code words respectively, each code word being formed by a plurality of codes representing the plurality of components of a given pixel value and wherein the step of decoding the second series of codes comprises separately decoding the codes of a code word of the second series to generate a plurality of components forming a corresponding pixel value. Pixel colours can thus be represented using a desired set of components such as red, green and blue (RGB) or YUV (luminance plus two colour difference values).

In such an apparatus, each code word may represent a pair of adjacent pixels of the row and comprise two codes defining a differential luminance component once for each pixel of the pair and two codes defining two respective colour difference components once only for both pixels of the pair. The resolution of the coded image in terms of luminance is thus twice the resolution in terms of each of the first and second colour differences in recognition of the different sensitivities of the human eye to colour and brightness. Such embodiments also afford a high degree of data compression and can be compatible with existing systems such as CD-I in which codes for different components are processed simultaneously as code words. Entire code words of the first series may be expanded directly to generate corresponding groups of code words of the second series. This can save time in some embodiments.

The expanding means may for example comprise a look-up table memory containing the group of codes or code words corresponding to each code or code word that may occur in the first series of codes or code words. This provides a simple implementation of the expanding means which can either take the form of a simple addition to existing hardware or may form part of the existing main memory of a display apparatus.

The invention further provides an apparatus for reproducing a stored image comprising a decoding apparatus as set forth above wherein the means for receiving the first series of codes comprises means for reading the said first series of codes from a storage device, the apparatus further comprising means for supplying the second series of pixel values to a display device. The first series of codes can be stored in a relatively small memory space, and retrieved at a relatively low data rate. After retrieval, an expanded image having two or more times as many pixels can be displayed with at least approximate linear interpolation, thereby improving the size, rate and/or quality of the images that can be retrieved from a given type of storage device.

The storage device may be an optical disc. As in the CD-I system, for example, optical discs offer very large amounts of storage, but at a limited data rate. The use of the invention mitigates one effect of this limitation in a way which is very simple and can be implemented at low cost. This makes the invention more suitable than known solutions for use in consumer products such as CD-I apparatus, since little or no modification to the consumer apparatus is required.

The expanding means may include means for reading from the storage device information defining the group of codes or code words of the second series which corresponds to each code or code word that may occur in the first series. This allows a flexible definition of the expanded codes, which can be stored with the image data to which it relates, rather than being fixed in a reproducing apparatus. For example in the CD-I system, a program loaded from disc could set up a look-up table in memory of the type referred to above or could define a simple formula, for use in expanding the received codes. It is an advantage of the invention that such an expanding means can be implemented using the components present in a standard CD-I player, without any hardware modification at all. Alternatively, the said information could be provided permanently within the apparatus.

The invention still further provides a method of encoding a first series of values representing a row of pixels of a digitised image, the method comprising differentially encoding the first series of pixel values to generate a first series of codes representing a first series of differential values, wherein the differences between successive pixel values are quantised using a first set of quantisation levels, each of which is the sum of a plurality of levels of a second set of quantisation levels, the second set of quantisation levels being that set defined for the decoder in a player according to the Compact Disc-Interactive standard. An image encoded in this way can be expanded and then decoded for display using the standard CD-I decoding chip or equivalent. The encoding may for example be performed by a software producer and the series of codes produced can be transmitted (either directly or via a storage device such as an optical disc) at a relatively low data rate to one or many locations where it can be expanded and decoded for display using the standard components already developed for the CD-I player.

The invention still further provides a method of storing a digitised image, comprising generating a first series of codes or code-words representing a first series of differential values corresponding to each row of pixels of the image and storing the said series of codes in a storage device together with information defining plurality of groups of codes or code words for use in defining a second series, each group corresponding to a different code or code word that may occur in the first series. Images can thus be stored, replicated and distributed, for example as part of the software for a CD-I application, and retrieved from the storage device using a CD-I player which can be programmed automatically to display images expanded and interpolated as desired.

The invention still further provides a storage device, such as an optical memory disc, wherein an image has been stored in accordance with a method as set forth in the preceding paragraph. Such a disc would offer its user improved images over those that have hitherto been available in the CD-I system.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS OF THE INVENTION

Figure 1:
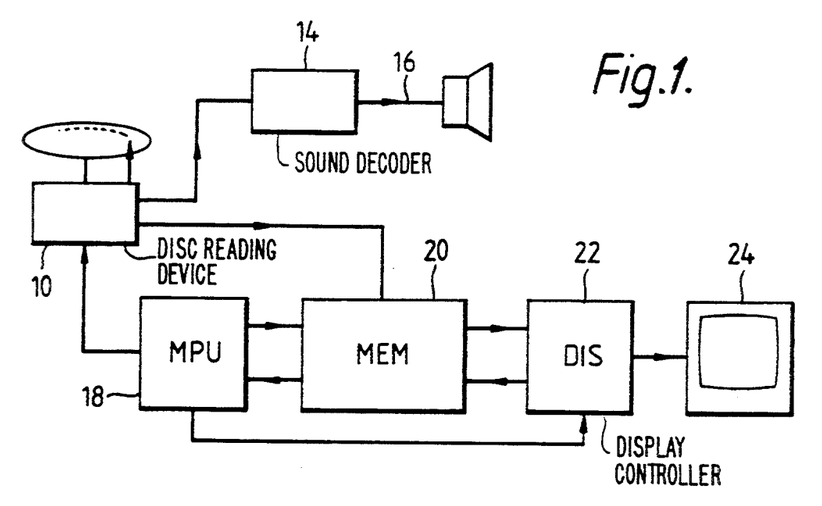
FIG. 1 shows in block schematic form an apparatus in accordance with the present invention.

FIG. 1 shows in block schematic form an apparatus of the kind described in the opening paragraph. In the embodiments to be described, the data channel is the output of a disc-reading device 10. The device 10 may be a magnetic disc drive, but in particular it may be an optical compact disc (CD) drive, of the form well-known for digital audio reproduction (CD-DA). As in the CD-DA system, the device 10 directs a reading head to appropriate parts of the disc and passes information read from the disc to a sound decoder 14 which provides an audio output at 16.

It is well-known, however, that optical discs and the CD format in particular have wider applications than digital audio, and in a development of the Compact Disc known as Compact Disc-Interactive (CD-I), the apparatus also includes a general-purpose microprocessor 18 which controls the device 10 and can direct parts of the data read from the disc to a memory 20 rather than directly to the sound decoder 14. The data may comprise programs for the microprocessor 18 and encoded picture information in a raster scan format, as well as audio data.

A display controller 22 continually reads appropriate parts of the memory 20 to generate images on a display device 24 such as a TV monitor. Pictures can be encoded according to many different formats, such as straightforward RGB (red, green and blue) values or run-length coded values. In the present example, differential pulse-code modulation (DPCM) is used to achieve a compact presentation of the video information. Various DPCM formats are known, and by way of example only this description will refer to the system known as DYUV (Differential YUV) which is used in the CD-I system to convey natural photographic images, and in particular moving picture sequences.

Figure 2:
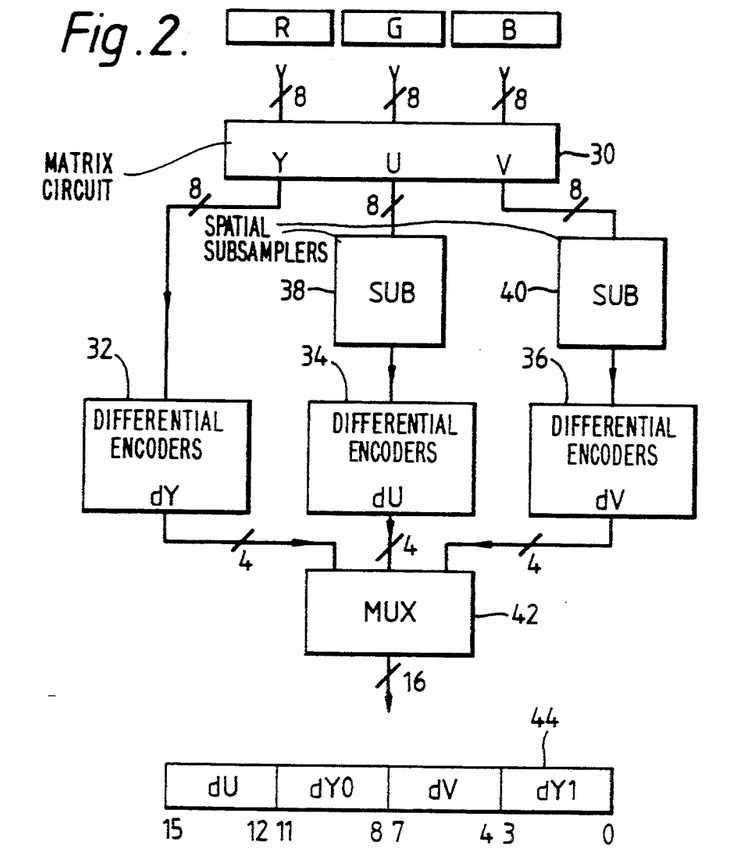
FIG. 2 shows a differential encoding apparatus compatible with the apparatus of FIG. 1.

FIG. 2 shows in block schematic form an encoder for converting digitised RGB images to DYUV format. Red, green and blue values for each pixel are received in digital form as three 8-bit values R, G and B from the image source, which may for example be a video camera, a recording or a computer graphics generator. The whole image in a PAL-compatible system may for example contain 280 lines of 384 pixels, and at 24 bits per pixel for full RGB coding the amount of data required to represent a full image would be 280×384×24 bits which is about 315 kilobytes. Such a large amount of data would take nearly two seconds to read from a compact disc or equivalent data channel so that realistic moving picture retrieval would be impossible.

In the DYUV encoder shown in FIG. 2, the RGB values for each pixel are converted in a matrix circuit 30 to three 8-bit values Y, U and V as is done in conventional colour television transmission, where Y is the luminance and U and V are colour difference values.

The Y value for each pixel is then passed to a differential encoder 32. In the encoder 32 the Y value for each pixel is compared with that of the previous pixel (or with a fixed value for the first pixel in each line) and the difference is quantised and encoded as a four-bit value dY in accordance with a predetermined code such as that shown in Table 1 below. The code dY can take any value from 0 to 15, to represent one of a non-linear range of quantisation levels from −79 to +128. Since the actual difference values will generally fall between two of the predetermined quantisation levels, any error is carried forward by the encoder 32 to the next pixel to avoid accumulation of errors.

TABLE 1

| Quantisation Value | Code |
| --- | --- |
| 0 | 0 |
| 1 | 1 |
| 4 | 2 |
| 9 | 3 |
| 16 | 4 |
| 27 | 5 |
| 44 | 6 |
| 79 | 7 |
| 128 | 8 |
| −79 | 9 |
| −44 | 10 |
| −27 | 11 |
| −16 | 12 |
| −9 | 13 |
| −4 | 14 |
| −1 | 15 |

There are also differential encoders 34 and 36 for the U and V values respectively, but before the U and V values are supplied to these encoders, they are processed by sub-samplers 38 and 40 respectively so that only one U and V value is encoded for each pair of pixels. This achieves substantial data compression at the expense of colour resolution. This is acceptable however because the human eye is known to have a relatively low spatial resolution for colours compared with that for luminance. The sub-samplers 38, 40 could operate by simply ignoring every other pixel, but to avoid aliasing effects it is preferable that some low-pass filtering function is included, for example by encoding the averages of the U and V values for each pair of pixels.

Therefore for every pair of pixels defined by the input RGB values the encoders 32, 34 and 36 produce two dY codes, one dU code and one dV code. These codes are combined by a multiplexer 42 to form a sixteen-bit code word 44 for each pixel pair. Bits 0 to 3 contain the dY code for the second pixel in the pair (dY1), bits 4 to 7 contain the dV code for the pair, bits 8 to 11 contain the dY code for the first pixel (dY0) and bits 12 to 15 contain the dU code for the pair.

The code words 44 for every pixel pair on every line of the image can be stored in a space of 384×280×16/2 bits which is about 105 kilobytes—one third of the space required for a full RGB image. Therefore a full-screen, normal resolution DYUV image can be read from an optical disc (or any data channel operating at about 150 kbytes/sec.) in about two thirds of a second.

Figure 3:
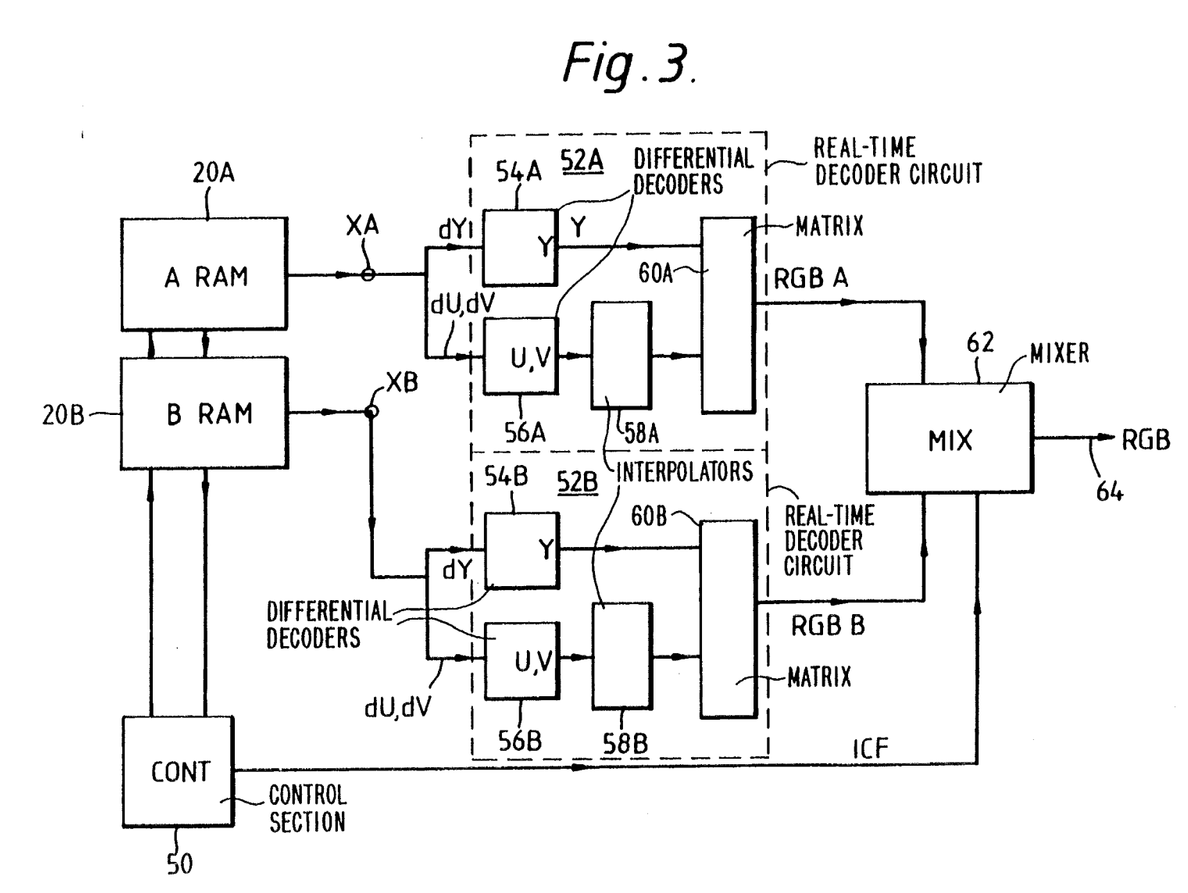
FIG. 3 shows part of the apparatus of FIG. 1 in more detail.

In the apparatus shown in FIG. 1 the DYUV codes read from the disc are transferred directly to the memory 20 and are decoded within the display controller 22 synchronously with the display scanning. FIG. 3 shows in more detail the memory 20 and part of the display controller 22 in the apparatus of FIG. 1. The memory 20 is a random access memory (RAM) divided into two banks, 20A and 20B. Each bank 20A and 20B serves as a display memory for one of two display channels A and B respectively, which can be used to combine two different images in various ways (for example mattes, colour keying, fading etc.) to afford a versatile range of display options. The incoming data from the disc can be directed under control of the microprocessor 18 or by means of codes within the data itself to either bank of memory.

Once in the memory 20A or 20B, the data is addressed under the control of a control section 50 of the display controller 22. Areas within the memory 20 are used for the storage of a Display Control Program (DCP) which tells the control section 50 which locations in the memory 20 correspond to which parts of the screen as described below. The control section 50 then generates the addresses required to scan the memory banks 20A and 20B synchronously with the raster scan of the display screen 24 (FIG. 1). In the CD-I system, part of the display controller's function is performed by the microprocessor 18 under the control of interrupt signals synchronised with the display scanning, as described below.

The DYUV code words read from the memory 20A or 20B are passed to respective real-time decoder circuits 52A and 52B. The decoders 52A and 52B are identical and will be described as a single unit without the suffixes A and B. The incoming 4-bit dY codes are passed to a differential decoder 54 which generates 8-bit Y values by adding the differential value represented by the incoming dY code (see Table 1) to the Y value of the previous pixel. Similarly the 4-bit dU and dV values are passed to a second differential decoder 56, which generates alternately the 8-bit U and 8-bit V values. It will be remembered that the U and V values are encoded at half the horizontal resolution of the Y values. The U and V values are therefore passed to an interpolator 58 which replaces the missing U and V values by forming the linear average of the two adjacent values.

The decoded Y, U and V values are then fed to a matrix 60 which converts YUV to RGB format to give a set of RGB values for each channel RGBA and RGBB. The two picture signals RGBA and RGBB are linearly combined by a mixer 62 in proportions defined by an Image Contribution Factor (ICF) for each channel which is supplied by the control section 50 to generate the final 3-by-8-bit RGB display output at 64. The ICF for a channel can be defined either for an entire field or line by line by means of instructions in the Display Control Program (DCP). The nature and operation of the DCP will be described in more detail below with reference to FIGS. 10 and 11.

Since the decoding circuitry operates in real-time, synchronously with the display scanning, it will be appreciated that the factor which most severely limits the ability of the known apparatus to display moving pictures is the rate at which data can be read from the optical disc or other data channel (one full image every two thirds of a second). To display moving images a refresh rate of at least 12 and preferably 24 to 30 images per second is necessary. Different techniques may be adopted to increase the image refresh rate. One technique would be to use a more highly compressed coding technique such as that developed for the Digital Video Interactive (DVI) system, described for example in Electronics magazine, Nov. 26th 1987 at pages 97 to 99. However, the DVI coding demands very powerful computing apparatus to encode the images, and the real-time decoders required are too expensive for consumer products.

Within a consumer product such as CD-I, a simple method of reducing the amount of data required for moving pictures is to reduce the resolution with which it is displayed. This is possible because the viewer tends to be less critical of moving pictures than still pictures. Alternatively the area of the screen that is used for moving pictures may be reduced or both methods may be used in combination.

An example of reducing the area of the screen is to use the normal display resolution and to reduce the displayed area to 10 per cent of the full screen area. This reduces the coded display information to about 10 kilobytes, thus enabling images to be refreshed at a rate of 15 per second. If the horizontal and vertical display resolution are both reduced by a factor of 2, then the coded data required can be reduced by a factor of 4, thus enabling the displayed area to be increased to 40% of the total screen area at the same refresh rate. Similarly, a decrease in resolution by a factor of 3 will reduce the data by a factor of 9 and enable the displayed area to be increased to 90% of the total area.

It is inevitable that reducing the resolution in the line scan (horizontal) direction and/or field-scan (vertical) direction will reduce the ability of the viewer to perceive fine detail, but even so the techniques hitherto available for expanding the received image are unsatisfactory either because of their expense or poor performance.

Figure 4:
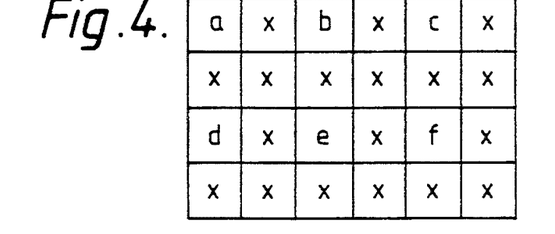
FIG. 4 illustrates the expansion of a low resolution image in the line scan (horizontal) and field scan (vertical) directions.

The problem to be addressed will be described with reference to FIG. 4, which shows a small array of pixels (4 lines by 6 pixels) which may represent part of a larger display. The data channel has supplied pixel values a to f which are only sufficient for one in four of the pixels in the array. Therefore the values for the remaining pixels, marked with an 'x' must be synthesised within the decoding apparatus.

Figure 5:
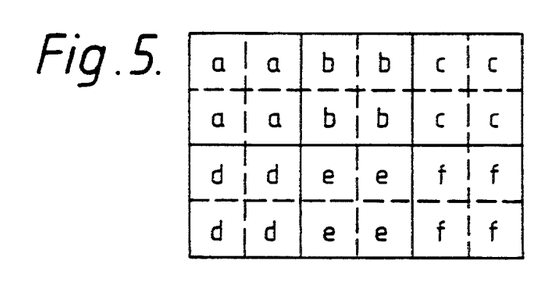
FIG. 5 illustrates a known method of expansion in the apparatus shown in FIG. 1.

A simple solution is illustrated in FIG. 5. Each pixel value a to f is displayed over a small block of pixel locations. This technique is available within consumer apparatus such as the basic CD-I player, but has the disadvantage that the resultant "mosaic" effect is unnatural and visually obtrusive to viewers.

Figure 6:
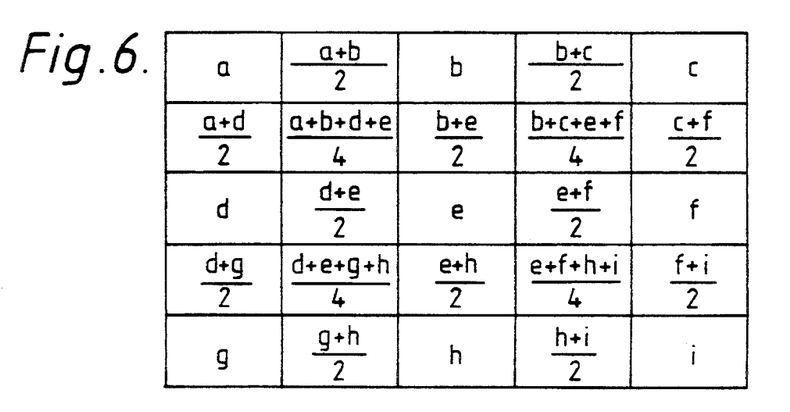
FIG. 6 illustrates the ideal linearly interpolated expansion of the image shown in FIG. 4.
Figure 7:
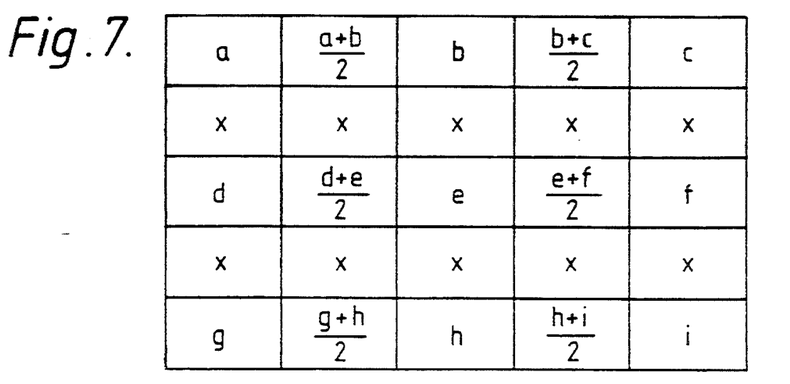
FIG. 7 illustrates an intermediate stage in the linear interpolation process.

A better solution is to spatially filter the lower resolution image to generate intermediate pixel values. In its simplest form, illustrated by FIG. 6, this spatial filtering can be performed by linear interpolation. Each intermediate pixel now has a value which is the arithmetic mean of the adjacent pixels. A fifth row including received values g, h, i has been added to enable clearer illustration of the interpolation.

Figure 10:
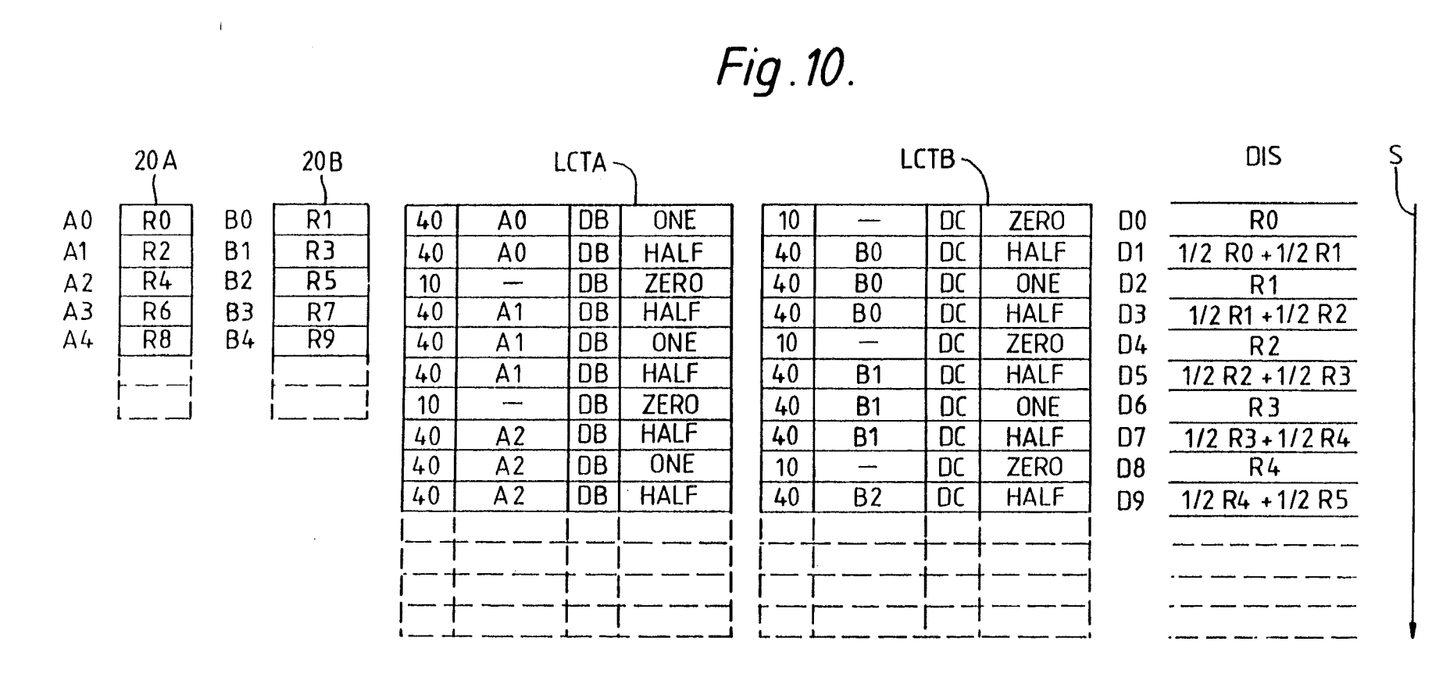
FIG. 10 illustrates schematically a first method of vertical interpolation.

The interpolated values may be computed in two stages, first in the horizontal or line scan direction and then in the vertical or field scan direction. The situation after the first stage is illustrated in FIG. 10, wherein the intermediate pixels on the first, third, fifth etc. lines have been given the values (a+b)/2 (b+c)/2 and so on. After this first stage, the values for the pixels in the second line may be calculated by averaging the corresponding values from the first and third lines. Similarly the fourth, sixth etc. lines can be completed by averaging the values from the third and fifth lines, fifth and seventh lines and so on. The above description simplifies the situation in a real system in that each pixel value will normally be a combination of three colour component values, such as RGB or YUV. The method of interpolation in such systems may vary depending on whether the three components can or cannot be treated independently, as is well-known in the art.

A more serious problem in differentially coded systems such as the DYUV system described above is that the actual pixel values may not be available at all until they are actually being displayed. To save memory space in the CD-I system, for example, the images are stored as received in DYUV format in the memory 20 (FIG. 1) and decoded in real-time by the display controller 22 for each scan of the display. The microprocessor 18 does not have sufficient power to decode the DYUV signals, perform linear interpolation and then re-encode to DYUV in the time available, and any specialised processor for this purpose would greatly increase the cost of the system.

In the embodiments described hereinafter, horizontal and vertical expansion are performed separately as described above with reference to FIG. 5 and 6, and will be described separately. By way of example only, the embodiments described will expand the received data by a factor of two in each direction, sufficient to fill nearly half of the full screen area 15 times a second with the exemplary values defined above. Those skilled in the art will readily see how to adapt the embodiments to achieve expansion by different factors, and will also appreciate that expansion need not be by the same amount in both directions.

The method of horizontal interpolation to be described relies upon the fact that differential pulse code modulation such as the DYUV system described uses simple one-dimensional (horizontal) prediction. The value of each component Y, U or V of a given pixel is equal to that of the previous pixel in the same line plus a quantised difference value represented by the 4-bit code dY, dU or dV. Because the codes represent difference values, they have the property that if two successive codes have the same value, then their difference values will be identical and consequently the value for the pixel corresponding to the first of the pair of identical codes will be the exact mean of the preceding and following pixels.

Figure 8:
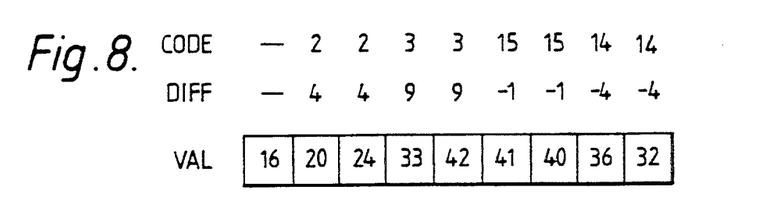
FIG. 8 illustrates the basis of the horizontal interpolation in accordance with the present invention.

A method of interpolation using the standard CD-I codes and difference values, as set out in Table 1, is illustrated in FIG. 8 in which the bottom line (VAL) represents a short sequence of nine pixels. The top line (CODE) contains the corresponding code values (dY, dU or DV) for one component of the pixel value and the middle line (DIFF) contains the corresponding difference values represented by those codes. In accordance with common differential coding practice, the first element of the line is set to some predetermined value, in this case 16, and there is thus no difference value or code associated with it. The following pixels are grouped into pairs having identical code values, and hence identical difference values. It will be seen that the resulting values for even pixels are exactly interpolated between those for odd pixels. Since the codes for each pair are identical, however, only one code need be transmitted to display two pixels.

Thus the first series of codes referred to above might be 2,3,15,14. The first series of codes would then be expanded in accordance with the invention so that each code of the first series is replaced by a group of two codes. For the situation shown in FIG. 8, the second series of codes would be 2,2,3,3,15,15,14,14, which can be decoded to give the interpolated pixel values of the bottom row (VAL). Clearly, if each code of the first series were expanded to a group of three codes of the series, then a three-fold expansion could be achieved, and so on, for greater expansion, subject to a maximum tolerable degradation in resolution.

Although this method solves the problem of interpolation it may in some cases place an undesirable restriction on the levels used to quantise the low resolution image. Effectively they are restricted to values of exactly twice the levels recognised by the decoder, namely the levels that are presently used in the coding of normal resolution pictures. However, the use of identical codes within a pair is not a necessary restriction. Any pair of codes may be used which together sum to a desired difference value. The only requirement is that they should be approximately equal in value and that their sum approximates to the desired quantised difference.

An alternative quantisation table which uses this principle is shown in Table 2. Each quantisation level (first column) is made up from the sum of two quantisation levels (1st Diff., 2nd Diff.) taken from Table 1. The resulting quantisation levels aproximate to the levels used in Table 1 (which may be regarded as optimum levels) and the values within each pair have also been chosen to be as equal as possible so as to obtain approximate linear interpolation.

Expansion with interpolation can thus be achieved by feeding the standard decoders with pairs of code values (code', code") which represent the two quantisation levels (1st Diff., 2nd Diff.) required.

It will be noted that for quantisation levels 0, 1 and 4 the 2nd difference remains zero, so that the slight mosaic effect will remain where variations in colour/brightness are gradual across the row. This is necessary in order to achieve the optimum quantisation level 4 from the levels 0,1,4 etc. in Table 1. The level 5 ($=1+4$) could have been chosen to reduce the mosaic pattern. However, this would have left a large gap in the set of quantisation levels available, thereby degrading the overall channel performance. At quantisation levels above 4, however, the 1st and 2nd difference columns are both non-zero, so that the mosaic effect is avoided, and at least approximate interpolation is effected.

The values chosen are just one example of a suitable code table and alternative values may be used. In particular it may be of advantage to use different quantisation levels for the Y, U and V signals.

TABLE 2

| Quantisation Level | Code | 1st Diff. | 2nd Diff. | Code' | Code" |
|---|---|---|---|---|---|
| 0 | 0 | 0 | 0 | 0 | 0 |
| 1 | 1 | 1 | 0 | 1 | 0 |
| 4 | 2 | 4 | 0 | 2 | 0 |
| 8 | 3 | 4 | 4 | 2 | 2 |
| 18 | 4 | 9 | 9 | 3 | 3 |
| 25 | 5 | 16 | 9 | 4 | 3 |
| 43 | 6 | 27 | 16 | 5 | 4 |
| 71 | 7 | 44 | 27 | 6 | 5 |
| 123 | 8 | 79 | 44 | 7 | 6 |
| −71 | 9 | −44 | −27 | 10 | 11 |
| −43 | 10 | −27 | −16 | 11 | 12 |
| −25 | 11 | −16 | −9 | 12 | 13 |
| −18 | 12 | −9 | −9 | 13 | 13 |
| −8 | 13 | −4 | −4 | 14 | 14 |
| −4 | 14 | −4 | 0 | 14 | 0 |
| −1 | 15 | −1 | 0 | 15 | 0 |

Once these quantisation levels have been fixed it is possible to encode a low-resolution image using differential encoders identical to those (32, 34, 36) shown in FIG. 2, apart from the different quantisation levels.

The output code values from the separate differential Y, U and V pulse code modulation coders must be combined for storage on the optical disc. The method of coding must preserve the coding information and should require the minimum storage capacity. On the other hand it should be relatively easy to decode and display the encoded data using the standard CD-I display apparatus. In the CD-I environment therefore, this means that the coded values should be easily translated to the sequences of DYUV code words (44 in FIG. 2) that are recognised by the decoders 52A, 52B in the display apparatus.

In one suitable embodiment, the new encoder generates 16 bit code words of the same form dU-dY0-dV-dY1 as before, but using the new set of quantisation levels. The process of translating these code words, when read from the disc, into pairs of "normal" code words will then involve (i) separating the dY0, dY1, dU and dV codes from the received code word; (ii) using these code values to obtain the corresponding groups of two normal resolution codes which can be referred to as dY0' and dY0", dY1' and dY1", dU' and dU", and dV' and dV", and (iii) combining these codes in the correct order to form a group of two 16-bit code words which form the second series of codes and can be passed to the display controller. This process could be performed for example by a pair of logic circuits inserted at the points XA and XB shown in FIG. 3.

Figure 9:
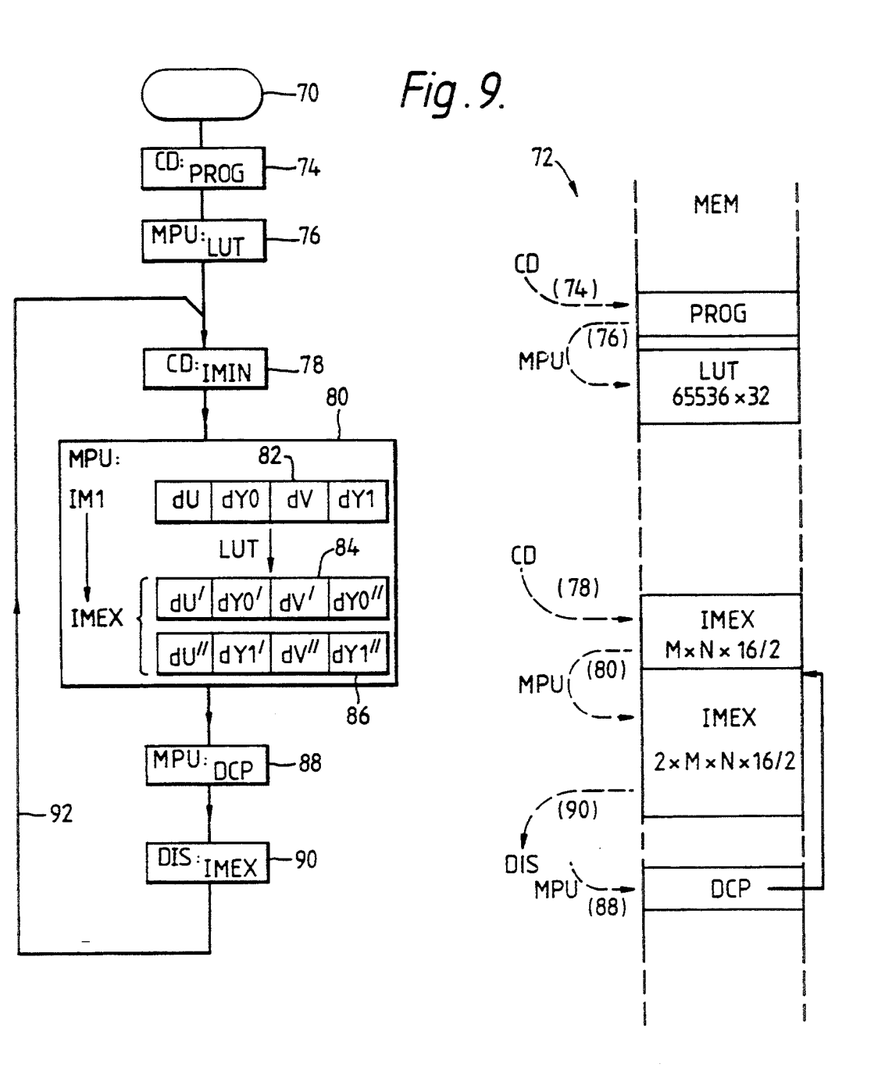
FIG. 9 is a flow chart and memory map illustrating an embodiment of a method in accordance with the present invention.

FIG. 9 illustrates an embodiment of the invention which takes advantage of the fact that the appparatus shown in FIG. 1 includes a microprocessor (18, FIG. 1) which can be controlled by program data read from the optical disc. Using the embodiment of FIG. 9, a method and apparatus in accordance with the invention can be implemented without modification of the existing decoding hardware, in this example a CD-I player. FIG. 9 includes a flow chart, starting at a step 70, and a memory map 72 to illustrate the contents of (one bank of) the main memory 20 of the apparatus (FIG. 1) during the performance of the method.

The first action in any CD-I application is to read from the disc (10) the program which defines the sequences of images, sounds and text which will be presented to the user using the data stored elsewhere on the disc. This is performed in step 74 of the flowchart and results in program data PROG being loaded into the memory (20) as indicated on the memory map 72. The flow of information into and out of the memory (20) is indicated on the memory map by a series of dashed arrows, labelled with the reference of a corresponding step of the flow chart in parentheses.

The microprocessor (MPU) (18) then reads the program PROG and performs accordingly. The program contains information defining the operations required to translate a DYUV code word of the first series into a group of (in this case) two DYUV code words of the second series, in order to generate an expanded image for display. In the embodiment illustrated, the program PROG causes the microprocessor (18) to set up a so-called look-up table LUT in another part of the memory (step 76).

The look-up table (LUT) in the present embodiment can be addressed by a 16-bit code word and contains 65536 32-bit entries, each defining a pair of DYUV code words for one of the possible 16-bit addresses.

After the LUT has been set up, the apparatus is prepared to read a sequence of images from the disc and display them, expanded, on the display device (24) in response to instructions in the program data PROG. In step 78, a first block of image data IMIN is read from the disc and loaded into the memory. The data IMIN is in the form of DYUV code words as described above and would be sufficient to define a normal resolution image of N rows with M pixels in each row, that is $M \times N \times 16/2$ bits of information.

In step 80, the microprocessor (18) under the control of the program PROG, reads each code word 82 of the first block IMIN from the memory (20) in turn to form a first series of code words. Each code word is then used as an index to address the LUT area of the memory and reads from the LUT a pair of code words 84 and 86 which form a corresponding group of code words of a second series of code words defining a second block of image data IMEX. The data IMEX stored in a further area of memory as indicated, and contains $2 \times M \times N \times 16/2$ bits of information, sufficient to define an image having N rows of pixels with $2 \times M$ pixels in each row.

It should be noted that since the two codes dY and dY1 represent two successive pixels, the arrangement of the expanded codes dY0', dY0", dY1' and dY" in the two code words 84 and 86 must be done so as to achieve the correct order for the four expanded pixels. This can be done as shown in FIG. 9, step 80.

As an illustrative example, one code word 82 of the first series (IMIN) might contain the codes dU-dY0-dV-dY1=8-13-5-11. Using the expansions given in Table 2, the first code word 84 of the corresponding group in the second series (IMEX) would contain the codes dU'-dY0'-dV'-dY0"=7-14-4-14 and the second code word 86 of the group would contain the codes dU"-dY1'-dV"-dY1"=6-12-3-13.

When all the $M \times N$ code words of the data IMIN have been expanded the microprocessor instructs (step 88) the display controller (22) to display an image using the expanded data IMEX. In a CD-I apparatus, this is achieved by constructing a Display Control Program (DCP) in an area of the memory which contains a pointer to the start of the area IMEX. Once the DCP is set up, the display controller control section (50, FIG. 3) proceeds automatically (step 90) to cause the second series of code words (data IMEX) to be read from the memory (20A or 20B) and passed to the real-time decoder (52A or 52B) for synchronous display on the display device (24), just as if the data IMEX had been loaded directly from the disc.

By following the loop path 92 in the flow chart, a new image can be read and expanded to replace the presently displayed image, at a rate substantially twice that which would be required to display a $2M \times N$ image read directly from disc.

Variations on the method described will be apparent to those skilled in the art. For example, the LUT contents could be loaded from the disc (10) directly, rather than being generated by means of a program. Which method is used will depend upon whether storage space on the disc is in short supply, and whether the time taken to read such a large amount of data from the disc is acceptable or not. Instead of a look-up table, the MPU (18) could calculate each group of code words using a formula defined in the program. This will generally save memory space, but will be slower than a look-up table.

Using a larger look-up table, or a formula, expansion by three or more times is possible in principle. In a standard CD-I player, however, the Motorola MC68070 microprocessor presently used is only considered fast enough to provide a two-times expansion for moving pictures, and only by using a look-up table.

Two methods will be described for performing linear interpolation in the field scan (vertical) direction. Either method can be performed in an apparatus of the type described, without hardware modification, in other words by a standard CD-I apparatus.

The first method of vertical interpolation is illustrated in FIG. 10. The method makes use of the features of the known apparatus described hereinbefore, in particular the feature that: the system has two separate display channels (A and B) which can both contribute in controlled proportions to the displayed image. The method further makes use of a facility available in many known systems which enables the programmer to reconfigure the display controller 22 (FIG. 1) in the blanking periods between display lines if required.

Using the CD-I apparatus as an example, the display controller 22 operates in accordance with a Display Control Program (DCP) stored in part of the memory 20. In operation, the DCP can cause the microprocessor 18 to be interrupted and to carry out instructions in the DCP for example to alter the contents of address registers within the display controller 22. The DCP comprises a Field Control Table (FCT) and Line Control Table (LCT) for each channel (A or B). The instructions in the FCT for a given field are executed in the blanking period before that field. The LCT for a display channel contains an entry for each display line, and each entry can contain up to eight 32-bit instructions to be executed in the blanking period before that display line. In the absence of explicit instructions in the entry for a particular display line, the display controller will increment its registers on the assumption that data for the line to be displayed is stored immediately following the data for the previous line.

Each DCP instruction consists of an 8-bit code and a parameter of up to 24 bits. There are many different instructions available, and only those used in the embodiments to be described will be explained briefly. A "No Operation" instruction is provided (op-code 10 hex; no parameter) for filling any unused instruction fields. A "Load Display Line Start Pointer" instruction is provided to define the address at which the coded pixel data for the next display line is to be read from the memory 20 (Op-code 40 hex; address parameter). An "Load Image Contribution Factor (ICF)" instruction is provided for each channel to define the relative intensity for that channel until it is changed by a subsequent DCP instruction. The op-code for the Load ICF instruction is DB hex in channel A and DC hex in channel B. The parameter for Load ICF is a 6-bit value ICF representing a factor from zero to one.

In FIG. 10, the field scan direction is indicated by the arrow S. Series of pixel codes representing lines of the low resolution image are received from the data channel and the received lines are referenced R0, R1, R2, R3 and so on in the figure. In accordance with this first method of vertical interpolation, these received lines are stored alternately in the A and B banks of image memory (20A and 20B). Thus the line R0 is stored at a first location A0 in the memory 20A, the line R1 is stored at a first location B0 in the memory 20B and so on, as illustrated in FIG. 10.

To display an interpolated low resolution image, Line Control Tables LCTA and LCTB are set up in the memory 20 to vary the image contribution factor for each display channel and to address the memory banks 20A and 20B in a particular fashion as the field scan progresses. LCTA and LCTB are shown in FIG. 10 alongside a representation, labelled DIS, of the lines D0, D1, D2 etc. of the image to be displayed. Each LCT (LCTA and LCTB) contains an entry corresponding to each such display line, and two of the possible eight instructions in each entry are used, the remainder being filled with the op-code 10 hex (No Operation). Each instruction comprises one of the hexadecimal op-codes defined above and a parameter, where appropriate.

The sequence of operation is dictated by the two LCT's shown as follows:

(D0) the address A0 of the first image line in the A-channel memory is loaded so that the received line R0 is displayed with an ICF of one, while the ICF for the B channel is set to zero;

(D1) the address A0 of the first line in the A-channel is loaded so that the line R0 is displayed again with an ICF of one half, and in the B-channel the address B0 of the first line in the channel memory is loaded so that the line R1 is also displayed with an ICF of one half;

(D2) the address B0 of the first line in the B-channel memory is loaded so that the line R1 is displayed with an ICF of one, while the ICF for the A-channel is set to zero;

(D3) the address A1 of the second line in the A-channel is loaded so that the line R2 is displayed with an ICF of one half and in the B-channel the address B0 of the first line in the B-channel memory is loaded so that the line R1 is displayed with an ICF of one half.

This sequence of alternating full intensity lines R0, R1, R2 etc. from a single display channel with half intensity lines from both channels is repeated to build up a complete image DIS in which alternate lines D1, D3, D5 etc. are interpolated between the values of the adjacent lines. The values may be expanded in the horizontal direction either before or after vertical expansion if desired.

It will be appreciated that the sequence of ICF values used above is not the only one possible. For example, instead of interpolating at half-way points between received lines, the displayed lines D0,D1,D2 etc. could all be interpolated lines, for example at the values one quarter and three quarters of the way between the received lines. The method depicted in FIG. 10 will be seen however to be capable of displaying one more line than is possible with other fractions using the same number of received lines, since it is not possible to interpolate beyond the first and last received lines.

Similarly, two or even more lines could be interpolated between the received lines, for example using ICF's of one-third and two-thirds, to display two interpolated lines between received lines and so achieve a threefold expansion. Non-integer expansion factors and even reduction of images are also possible using this method. The degree of expansion possible is limited only by the acceptability of the resulting low resolution images.

The first method of performing vertical interpolation just described has the disadvantage of requiring the use of both display channels, thus precluding the use of other visual effects which the application designer would otherwise have available.

Figure 11:
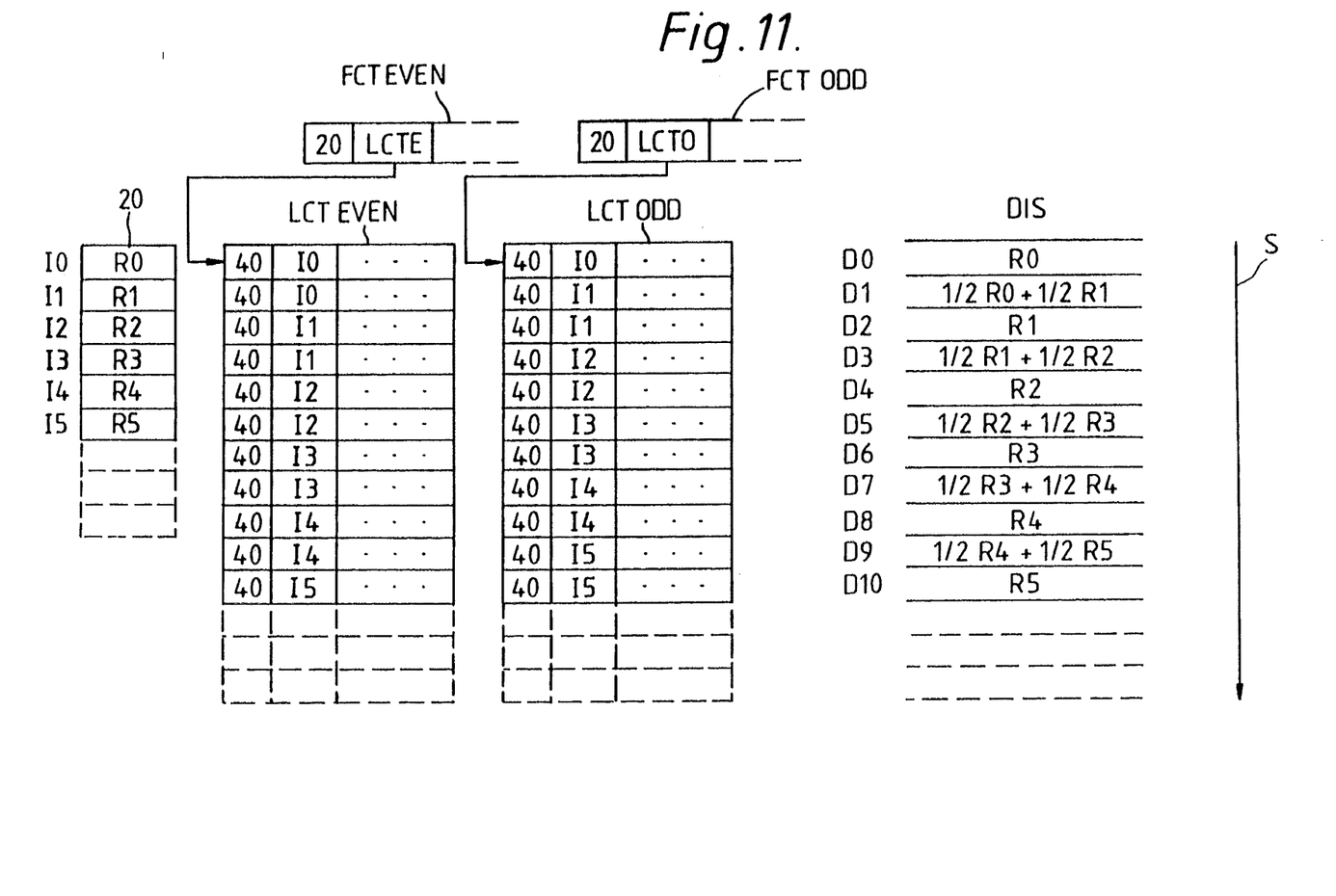
FIG. 11 illustrates schematically a second method of vertical interpolation.

Using an alternative, second method, which is illustrated in FIG. 11, it is possible to achieve a similar result using only a single display channel. In this second method the received data R0, R1, R2, etc. is all directed into a single display channel memory 20 (20A or 20B), at addresses I0, I1, I2, etc., and the special display sequence defined, in this example, by the DCP generates interpolated lines by averaging the intensity of adjacent lines over a number of successive field periods.

Two Line Control Tables (LCT's) are stored in the memory, one labelled LCTEVEN and one labelled LCTODD in FIG. 11. Each LCT has an entry corresponding to each line D0, D1, D2, etc. of a displayed image DIS. Only one instruction out of the eight possible is used in each such entry, the remainder being filled with op-code 10 hex (No Operation). Two Field Control Tables FCTEVEN and FCTODD are also set up, and are executed before alternate field scans of the displayed image.

The FCT for even-numbered fileds FCTEVEN contains an instruction "Load Control Table Start Pointer" (Op-code 20 hex; address parameter) with the address LCTE at which the table LCTEVEN is stored, so that LCTEVEN forms the LCT for even-numbered fields. The FCT for odd-numbered fields FCTODD contains the same instruction, but with the address LCTO of the table LCTODD as a parameter, so that LCTODD is the effective LCT in the odd numbered fields.

LCTEVEN and LCTODD contain a series of Load Display Line Start Pointer instructions (Op-code 40 hex) with the addresses I0, I1, I2, etc. of the stored image lines R0, R1, R2, etc. as parameters. The line sequence displayed as a result of this arrangement is as follows:

(D0) the address I0 is loaded so that received line R0 is displayed;

(D1) in even fields, the address I0 is loaded so that line R0 is displayed again, whereas in odd fields the address I1 is loaded so that line R1 is displayed.

This pattern is repeated for lines D2, D3 etc. as shown in FIG. 11 to generate an image DIS in which alternate lines D1, D3, D5, etc. are interpolated, on average, between lines D0, D2, D4, etc. comprising the lines R0, R1, R2, etc. of the received image.

A disadvantage of this second method is that it introduces flicker at a rate of half the field rate of the display, but for most source material this is visually acceptable. Clearly the method can be extended to provide a three-fold or N-fold expansion, although flicker might soon become unacceptable at current refresh rates.

In a generalised version of the second method capable of producing an N-fold vertical expansion, where N is an integer greater than one, there will be N−1 intervening lines displayed between each pair of stored lines displayed. With K running from 1 to N−1 between one received line and the next, the Kth intervening line might comprise the one received line for N−K out of every N fields and comprise the next received line in the remaining K out of every N fields. In one such embodiment, N different Line Control Tables could be set up and used in rotation. It is easily seen how this general embodiment agrees with the more specific embodiment of FIG. 11 when N=2. To minimise flicker when N is large, the two groups of N−K and K fields for each intervening line should be interleaved as far as possible.

From reading the present disclosure, other modifications will be apparent to persons skilled in the art. Such modifications may involve other features which are already known in the design, manufacture and use of image transmission, recording and displaying systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A decoding apparatus comprising means for receiving a first series of codes representing a first series of differential values corresponding to a row of pixels of a differentially encoded image, means for expanding each code of the first series into a group of codes to form a second series of codes, each group of codes representing a plurality of differential values whose sum is the differential value represented by the corresponding code of the first series, and a decoder for decoding the second series of codes to generate a second series of pixel values for display.

2. A decoding apparatus as claimed in claim 1 wherein the expanding means is arranged to receive part of an image encoded using a first set of quantisation levels and the decoder is arranged to decode the second series of codes using a second set of quantisation levels, each level of the first set of quantisation levels being the sum of a plurality of levels of the second set.

3. A decoding apparatus as claimed in claim 2 wherein each level of the first set of quantisation levels is defined as that level which can be expressed as a sum of a plurality of levels of the second set and which is closest to an optimum level, each level of the plurality of levels of the second set of quantisation levels being chosen to be non-zero at least when the level of the first set exceeds a given value.

4. A decoding apparatus as claimed in claim 2 or claim 3 wherein the second set of quantisation levels is that set defined for the decoder in a player according to the Compact Disc-Interactive standard.

5. A decoding apparatus as claimed in any of claims 1 to 3 wherein each pixel value comprises a plurality of components and the first and second series of codes comprise first and second series of code words respectively, each code word being formed by a plurality of codes representing the plurality of components of a given pixel value and wherein the decoder comprises means for separately decoding the codes of a code word of the second series to generate a plurality of components forming a corresponding pixel value.

6. A decoding apparatus as claimed in claim 5 wherein each code word represents a pair of adjacent pixels of the row and comprises two codes defining a differential luminance component once for each pixel of the pair and two codes defining two respective colour difference components once only for both pixels of the pair.

7. A decoding apparatus as claimed in claim 5 wherein the expanding means operates on entire code words of the first series to generate corresponding groups of code words of the second series.

8. A decoding apparatus as claimed in any of claims 1 to 3 wherein the expanding means comprises a look-up table memory containing the group of codes or code words corresponding to each code or code word that may occur in the first series of codes or code words.

9. An apparatus for reproducing a stored image comprising a decoding apparatus as claimed in any of claims 1 to 3 wherein the means for receiving the first series of codes comprises means for reading the said first series of codes from a storage device, the apparatus further comprising means for supplying the second series of pixel values to a display device.

10. An apparatus as claimed in claim 9 wherein the expanding means includes means for reading from the storage device information defining the group of codes or code words of the second series which corresponds to each code or code word that may occur in the first series.

11. A decoding apparatus as claimed in claim 4 wherein each pixel value comprises a plurality of components and the first and second series of codes comprise first and second series of code words respectively, each code word being formed by a plurality of codes representing the plurality of components of a given pixel value and wherein the decoder comprises means for separately decoding the codes of a code word of the second series to generate a plurality of components forming a corresponding pixel value.

12. A decoding apparatus as claimed in claim 11 wherein each code word represents a pair of adjacent pixels of the row and comprises two codes defining a differential luminance component once for each pixel of the pair of two codes defining two respective colour difference components once only for both pixels of the pair.

13. A decoding apparatus as claimed in claim 6 wherein the expanding means operates on entire code words of the first series to generate corresponding groups of code words of the second series.

14. A decoding apparatus as claimed in claim 11 wherein the expanding means operates on entire code words of the first series to generate corresponding groups of code words of the second series.

15. A decoding apparatus as claimed in claim 12 wherein the expanding means operates on entire code words of the first series to generate corresponding groups of code words of the second series.

16. A decoding apparatus as claimed in claim 4 wherein the expanding means comprises a look-up table memory containing the group of codes or code words corresponding to each code or code word that may occur in the first series of codes or code words.

17. A decoding, apparatus as claimed in claim 5 wherein the expanding means comprises a look-up table memory containing the group of codes or code words corresponding to each code or code word that may occur in the first series of codes or code words.

18. A decoding apparatus as claimed in claim 11 wherein the expanding means comprises a look-up table memory containing the group of codes or code words corresponding to each code or code word that may occur in the first series of codes or code words.

19. A decoding apparatus as claimed in claim 6 wherein the expanding means comprises a look-up table memory containing the group of codes or code words corresponding to each code or code word that may occur in the first series of codes or code words.

20. A decoding apparatus as claimed in claim 12 wherein the expanding means comprises a look-up table memory containing the group of codes or code words corresponding to each code or code word that may occur in the first series of codes or code words.

21. A decoding apparatus as claimed in claim 7 wherein the expanding means comprises a look-up table memory containing the group of codes or code words corresponding to each code or code word that may occur in the first series of codes or code words.

22. A decoding apparatus as claimed in claim 13 wherein the expanding means comprises a look-up table memory containing the group of codes or :code words corresponding to each code or code word that may occur in the first series of codes or code words.

23. A decoding apparatus as claimed in claim 14 wherein the expanding means comprises a look-up table memory containing the group of codes or code words corresponding to each code or code word that may occur in the first series of codes or code words.

24. A decoding apparatus as claimed in claim 15 wherein the expanding means comprises a look-up table memory containing the group of codes or code words corresponding to each code or code word that may occur in the first series of codes or code words.

25. An apparatus for reproducing a stored image comprising a decoding apparatus as claimed in claim 4 wherein the means for receiving the first series of codes comprises means for reading the said first series of codes from a storage device, the apparatus further comprising means for supplying the second series of pixel values to a display device.

26. An apparatus for reproducing a stored image comprising a decoding apparatus as claimed in claim 5 wherein the means for receiving the first series of codes comprises means for reading the said first series of codes from a storage device, the apparatus further comprising means for supplying the second series of pixel values to a display device.

27. An apparatus for reproducing a stored image comprising a decoding apparatus as claimed in claim 11 wherein the means for receiving the first series of codes comprises means for reading the said first series of codes from a storage device, the apparatus further comprising means for supplying the second series of pixel values to a display device.

28. An apparatus for reproducing a stored image comprising a decoding apparatus as claimed in claim 6 wherein the means for receiving the first series of codes comprises means for reading the said first series of codes from a storage device, the apparatus further comprising means for supplying the second series of pixel values to a display device.

29. An apparatus for reproducing a stored image comprising a decoding apparatus as claimed in claim 12 wherein the means for receiving the first series of codes comprises means for reading the said first series of codes from a storage device, the apparatus further comprising means for supplying the second series of pixel values to a display device.

30. An apparatus for reproducing a stored image comprising a decoding apparatus as claimed in claim 7 wherein the means for receiving the first series of codes comprises means for reading the said first series of codes from a storage device, the apparatus further comprising means for supplying the second series of pixel values to a display device.

31. An apparatus for reproducing a stored image comprising a decoding apparatus as claimed in claim 13 wherein the means for receiving the first series of codes comprises means for reading the said first series of codes from a storage device, the apparatus further comprising means for supplying the second series of pixel values to a display device.

32. An apparatus for reproducing a stored image comprising a decoding apparatus as claimed in claim 14 wherein the means for receiving the first series of codes comprises means for reading the said first series of codes from a storage device, the apparatus further comprising means for supplying the second series of pixel values to a display device.

33. An apparatus for reproducing a stored image comprising a decoding apparatus as claimed in claim 15 wherein the means for receiving the first series of codes comprises means for reading the said first series of codes from a storage device, the apparatus further comprising means for supplying the second series of pixel values to a display device.

34. An apparatus for reproducing a stored image comprising a decoding apparatus as claimed in claim 8 wherein the means for receiving the first series of codes comprises means for reading the said first series of codes from a storage device, the apparatus further comprising means for supplying the second series of pixel values to a display device.

35. An apparatus for reproducing a stored image comprising a decoding apparatus as claimed in claim 16 wherein the means for receiving the first series of codes comprises means for reading the said first series of codes from a storage device, the apparatus further comprising means for supplying the second series of pixel values to a display device.

36. An apparatus for reproducing a stored image comprising a decoding apparatus as claimed in claim 17 wherein the means for receiving the first series of codes comprises means for reading the said first series of codes from a storage device, the apparatus further comprising means for supplying the second series of pixel values to a display device.

37. An apparatus for reproducing a stored image comprising a decoding apparatus as claimed in claim 18 wherein the means for receiving the first series of codes comprises means for reading the said first series of codes from a storage device, the apparatus further comprising means for supplying the second series of pixel values to a display device.

38. An apparatus for reproducing a stored image comprising a decoding apparatus as claimed in claim 19 wherein the means for receiving the first series of codes comprises means for reading the said first series of codes from a storage device, the apparatus further comprising means for supplying the second series of pixel values to a display device.

39. An apparatus for reproducing a stored image comprising a decoding apparatus as claimed in claim 20 wherein the means for receiving the first series of codes comprises means for reading the said first series of codes from a storage device, the apparatus further comprising means for supplying the second series of pixel values to a display device.

40. An apparatus for reproducing a stored image comprising a decoding apparatus as claimed in claim 21 wherein the means for receiving the first series of codes comprises means for reading the said first series of codes from a storage device, the apparatus further comprising means for supplying the second series of pixel values to a display device.

41. An apparatus for reproducing a stored image comprising a decoding apparatus as claimed in claim 22 wherein the means for receiving the first series of codes comprises means for reading the said first series of codes from a storage device, the apparatus further comprising means for supplying the second series of pixel values to a display device.

42. An apparatus for reproducing a stored image comprising a decoding apparatus as claimed in claim 23 wherein the means for receiving the first series of codes comprises means for reading the said first series of codes from a storage device, the apparatus further comprising means for supplying the second series of pixel values to a display device.

43. An apparatus for reproducing a stored image comprising a decoding apparatus as claimed in claim 24 wherein the means for receiving the first series of codes comprises means for reading the said first series of codes from a storage device, the apparatus further comprising means for supplying the second series of pixel values to a display device.

44. An apparatus as claimed in claim 43 wherein the expanding means includes means for reading from the storage device information defining the group of codes or code words of the second series which corresponds to each code or code word that may occur in the first series.

45. A method for encoding and storing a digitised image on a storage device for subsequent decoding by a decoding apparatus, said method comprising the steps of:
   a) generating a first series of codes representing a first series of differential values corresponding to each row of pixels of said image;
   b) generating information which is used by said decoding apparatus to expand each code of said first series into a group of codes within a second series of codes, wherein each group of codes represents a plurality of differential values whose sum is the differential value represented by the corresponding code of the first series; and
   c) storing said first series of codes and said information on said storage device.

46. The method as claimed in claim 45, wherein said storage device comprises an optical disc.

* * * * *